United States Patent
Ko et al.

(10) Patent No.: US 7,094,374 B2
(45) Date of Patent: Aug. 22, 2006

(54) METHOD FOR MANUFACTURING CERAMIC BALLS FOR WATER TREATMENT

(75) Inventors: Jae-Kyung Ko, Seoul (KR); Seong-Heon Kim, Daejeon (KR); Suck-Joon Kang, Kyunggi-Do (KR)

(73) Assignee: EE Ko Bio Co., (KR)

( * ) Notice: Subject to any disclaimer, the term of this patent is extended or adjusted under 35 U.S.C. 154(b) by 576 days.

(21) Appl. No.: 10/332,682

(22) PCT Filed: Jul. 6, 2001

(86) PCT No.: PCT/KR01/01155

§ 371 (c)(1),
(2), (4) Date: Jan. 9, 2003

(87) PCT Pub. No.: WO02/04366

PCT Pub. Date: Jan. 17, 2002

(65) Prior Publication Data

US 2003/0137068 A1    Jul. 24, 2003

(30) Foreign Application Priority Data

Jul. 11, 2000    (KR) ................ 10-2000-0039439

(51) Int. Cl.
*B29C 67/24*    (2006.01)
*C02F 1/10*    (2006.01)

(52) U.S. Cl. ................... 264/122; 264/123
(58) Field of Classification Search ........... 264/234, 264/122, 123; 427/212
See application file for complete search history.

(56) References Cited

U.S. PATENT DOCUMENTS 6,010,648 A * 1/2000 Yamamoto et al. ........ 264/15
6,068,828 A * 5/2000 Hata et al. ............... 423/608
6,187,260 B1 * 2/2001 Qin et al. .................. 419/45
6,203,768 B1 * 3/2001 McCormick et al. ......... 423/1
6,239,079 B1 * 5/2001 Topchiashvili et al. ..... 505/124
6,471,876 B1 * 10/2002 Hansen et al. ............ 210/764

FOREIGN PATENT DOCUMENTS

JP    07-048213    2/1995
JP    07-060277    3/1995

OTHER PUBLICATIONS

Patent Abstract for JP 07-048213, Feb. 1995.
Patent Abstract for JP 07-060277, Mar. 1995.
International Search Report, International Application No. PCT/KR 01/01155, International Filing Date Jul. 6, 2001, Date of Mailing for International Search Report Aug. 30, 2001.

* cited by examiner

Primary Examiner—Carlos Lopez
(74) Attorney, Agent, or Firm—Cantor Colburn LLP

(57) ABSTRACT

A method for manufacturing ceramic bails for water treatment capable of exerting microbicidal activity in water and solution is provided. The method includes producing a first composition by dissolving borax ($Na_2B_4O_7 \cdot 10H_2O$) and copper sulfate ($CuSO_4 \cdot 5H_2O$) in an equivalent ratio of 1:1 to water, and drying the solution to produce a first composition, producing a second composition by adding silica to a first mixture of nitric acid and silver mixed in an equivalent ratio of 1:1 while heating the first mixture, adding more than 3 weight percents of the first composition to 200 weight percents of distilled water based on 100 weight percents of a ceramic ball while heating the distilled water, adding more than 8 weight percents of the second composition to a second mixture of the first composition and the distilled water when a total weight of the second mixture is reduced by a half, and drying the second mixture; and dehydrating the second mixture at a temperature of 400° C. to 500° C.

5 Claims, No Drawings

METHOD FOR MANUFACTURING CERAMIC BALLS FOR WATER TREATMENT

BACKGROUND OF THE INVENTION

1. Field of the Invention

The present invention relates to a method for manufacturing ceramic balls for water treatment capable of exerting microbicidal activity in water and solution, more particularly a method for manufacturing ceramic balls for water treatment having excellent water-purifying and water-treating function capable of sterilizing microorganism or bacteria living or breeding in an aqueous solution.

A variety of ceramics typically include multiple pores in its interior. The mechanical and thermal properties of the article made of the said porous ceramics depend on the size, the shape, the porosity and the continuity of the pores existing inside the porous ceramics.

Particularly, the porous ceramics is used as lightweight building materials for a certain purpose, because the ceramics has the artificially formed multiple pores in its inside, and thereby rendering the materials light and low dense. Accordingly, the demand for the ceramics is largely increased in order to manufacture various filters, instruments for sintering, deodorants, heat-insulating materials, sound-proofing materials, fillers, immersing materials, flowerpot stones and the like.

2. Description of the Related Art

In recent, as the utility value of the porous ceramics in the field of water-purification, filter, and the like utilizing its own absorbent and deodorant property is increased, the development and the research for the porous ceramics has been vigorously made. As result, a number of technologies for the porous ceramics have been published.

However, there has been no porous ceramics having microbicidal action in itself until now. Therefore, the materials to be water-treated for sterilization were necessary to be purified with ceramics and then subjected to a separate sterilizing process.

The object of the present invention is to provide a method for manufacturing ceramic balls for water treatment for the purpose of solving the above problem by rendering ceramic balls in itself microbicidal activity in addition to purifying activity of ceramics, so that microorganisms or bacteria living or breeding in an aqueous solution may be effectively sterilized, and thus maximizing the water-treating function.

SUMMARY OF THE INVENTION

The object of the present invention can be accomplished by providing a method for manufacturing ceramic balls for water treatment, comprising thoroughly dissolving borax ($Na_2B_4O_7 \cdot 10H_2O$) and copper sulfate ($CuSO_4 \cdot 5H_2O$) in an equivalent ratio of 1:1 to water, and then heat drying the solution to give a product (hereafter refer to "Product A"); adding particulate silica to a separate vessel containing nitric acid and particulate silver in an equivalent ratio of 1:1 while heating to dry the mixture to give a product (hereafter refer to "Product B"); adding and mixing more than 3 weight percents of Product A to 200 weight percents of distilled water based on 100 weight percents of the ceramic balls in a separate vessel while heating; adding more than 8 weight percents of Product B thereto when the total weight of the said mixture in the vessel is reduced by half, and heat drying the mixture; and then sufficiently dehydrating the mixture at the temperature of 400° C. to 500° C.

DETAILED DESCRIPTION OF THE INVENTION

According to the present invention, firstly, borax ($Na_2B_4O_7 \cdot 10H_2O$) and copper sulfate ($CuSO_4 \cdot 5H_2O$) in equivalent ratio of 1:1 are thoroughly dissolved in water, and then heated to obtain Product A.

At this time, the water of crystallization bonded in borax and copper sulfate renders water solubility, and becomes an aqueous solution under the condition of the certain temperature and the required amount of water with the lapse of time. Copper compound makes silver compound easily adhere to the sphere at the same time, since copper compound has strong adhesive property to the surface of other materials. Borax is coated on the surface of them, thereby rendering coatable property.

According to the present invention, particulate silica is added to nitric acid and particulate silver in an equivalent ratio of 1:1 contained in a separate vessel while heating to give a mixture. The mixture is dried by evaporation to obtain product B.

When heating the said mixture of nitric acid and particulate silver, silver nitrate is produced as shown in below Reaction Formula 1. And the produced silver nitrate is changed to silver oxide ($Ag_2O$) as shown in below Reaction Formula 2.

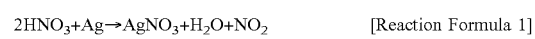
$2HNO_3 + Ag \rightarrow AgNO_3 + H_2O + NO_2$     [Reaction Formula 1]

$2AgNO_3 \rightarrow Ag_2O + 2NO_2 + \frac{1}{2}O_2$     [Reaction Formula 2]

The said silver oxide is again changed to ion type silver oxide under the alkaline state as shown in below Reaction Formula 3.

$Ag_2O + OH^- \rightarrow AgO^- + AgOH$     [Reaction Formula 3]

The silver oxide (II) ion produced in above Reaction Formula 3 incurs variation of amino acid constituting protein of microorganism or bacteria as shown in below Reaction Formula 4 to destroy cell membrane of bacteria, thereby rendering a sterilization activity.

[Reaction Formula 4]
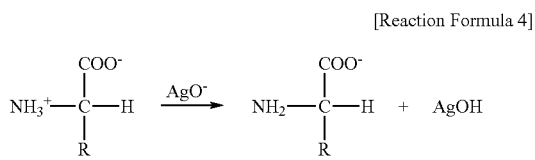

Particularly, since silver oxide produced in the above Reaction Formula 2 is effectively adhered to ceramic balls, particulate silica is added during reacting nitric acid with particulate silver so as to exerting sufficient sterilizing activity.

At this time, the added particulate silica serves as a medium capable of effectively adhering silver compound to ceramic balls. The amount of the added silica need not exceed the weight ratio of 2:1(w/w) to the particulate silver. If the ratio is less than 2:0.5 (w/w), there occurs a problem that cannot render sufficient sterilizing effect because the amount of particulate silver adhered to ceramic balls is small. Accordingly, it is preferable to add the said particulate silica in a ratio of 2:0.5 to 2:1 (w/w) to particulate silver.

According to the present invention, in order to manufacture ceramic balls rendering silver sufficient microbicidal effect, more than 3 weight percents of Product A are added to and mixed with 200 weight percents of distilled water based on 100 weight percents of the ceramic balls in a separate vessel while heating, more than 8 weight percents of Product B are added thereto and mixed therewith when the total weight is reduced at least by half. The resultant mixture is dried and sufficiently dehydrated at the temperature of 400° C. to 500° C.

For the said ceramic balls, the large sands manufactured by a separate method as well as the ceramic spheres manufactured by various methods may be used. The ceramic balls are not necessary to have sphere type, and any type of the ceramic balls may be used as long as they are inorganic materials.

Product A obtained by thoroughly dissolving borax and copper sulfate in a equivalent ratio of 1:1 in water and heat drying the mixture is added to the said ceramic balls in distilled water while heating. When the amount of Product A is less than 3 weight percents based on 100 weight percents of the ceramic balls, there occurs a problem that the amount of silver compound to be adhered to the surface of ceramic balls and the amount of copper compound aiding the adhesion of silver compound to the surface of ceramic balls are small, and thus the surfaces of the produced ceramic balls are not smooth, and the ceramic balls can not exert microbicidal activity. Therefore, it is preferable to add not less than 3 weight percents, more preferably 3 to 7 weight percents of Product A, based on 100 weight percents of ceramic balls. When the amount exceeds 7 weight percents, the large amount of copper compound is remained unadhered.

When the mixture obtained as above is heated until the volume is reduced by more than half of the total weight by evaporation of water, Product B obtained by adding nitric acid and particulate silver in a equivalent ratio of 1:1 to particulate silica and evaporating and drying is added. When the amount of Product B is less than 8 weight percents, there occurs a problem that the amount of silver compound adhered to ceramic balls is small, the surfaces of the resultant ceramic balls are not smooth, and thus the ceramic balls can not exert microbicidal activity. Therefore, it is preferable to add not less than 8 weight percents, more preferable 8 to 15 weight percents of Product B, based on 100 weight percents of ceramic balls. When the amount exceeds 15 weight percents, silver compound remained after being adhered, is adhered to ceramic balls and there causes unnecessary costs.

The ceramic balls having microbicidal activity according to the present invention can be manufactured by adding Products A and B to distilled water, drying and sufficiently dehydrating the mixture at the temperature of 400 to 500° C.

The said dehydrating temperature needs to remove the water of crystallization bonded to borax and copper sulfate. When the water of crystallization is removed from borax and copper sulfate adhered to ceramic balls at the said temperature, the borax and copper sulfate compound is present in ceramic balls in a water-insoluble state.

A microbicidal activity is presented according to the above Reaction Formulae 1 to 4, since silver nitrate has stability in the state that it is simultaneously adhered to copper compound and a very slight amount of silver nitrate is melted to an aqueous solution.

The present invention is described in more detail by Examples and Comparative Examples, but the Examples are only illustrative and, therefore, not intended to limit the scope of the present invention.

EXAMPLES

Examples 1 to 5

Borax and copper sulfate ($CuSO_4.5H_2O$) in an equivalent ratio of 1:1 are thoroughly decomposed in water, and heat dried to obtain Product A. Nitric acid and particulate silver in an equivalent ratio of 1:1 are charged in a separate vessel. Particulate silica is added thereto in an equivalent ratio of 2:1 (w/w) to the said particulate silver, and vaporized and dried to obtain Product B.

The said Product A is charged in a separate vessel containing 200 g of ceramic balls and 400 g of distilled water while heating in the proportion shown in Table 1 as below and is mixed. When the total weight is reduced by half, the said Product B is added thereto in the proportion shown in below Table 1, dried and sufficiently dehydrated at the temperature of 500° C. to produce ceramic balls having microbicidal activity. The condition of the resultant ceramic balls' surfaces are visually observed and the result is shown in below Table 1:

TABLE 1

|  | Amount of Product A (g) | Amount of Product B (g) | Condition of Surface |
|---|---|---|---|
| Example 1 | 2 | 22 | X |
| Example 2 | 6 | 22 | ⊚ |
| Example 3 | 10 | 22 | ⊚ |
| Example 4 | 10 | 10 | X |
| Example 5 | 10 | 16 | ⊚ |

⊚: smooth and glossy
○: glossy, but not smooth
X: not glossy nor smooth.

As is apparent in Table 1, when it was confirmed that the surface of ceramic balls is smooth and glossy when Product A is used in the range of the present invention in Examples 2 and 3, provided that Product B is used in same amount as 22 g in Examples 1 to 3. Meanwhile, the surface of ceramic balls is not glossy and smooth when the amount of Product A is less than the lower limit of the present invention in Example 1. The quality of the ceramic balls obtained in Example 1 is not good.

The reasons why the said result is obtained are that the surface of ceramic balls is glossy and smooth in case that silver compound adhered to ceramic balls is more than a certain amount, and that the surface of ceramic balls is not glossy and smooth in case that silver compound adhered to ceramic balls is small.

When it was also confirmed that the surface of ceramic balls is not smooth and glossy when Product B is used in an amount of less than the range of the present invention in Example 4, but the surface of ceramic balls is smooth and glossy when the amount of Product B is used in within the range of the present invention in Example 5, provided that Product B is used in amounts of 10 g and 16 g in Examples 4 and 5, respectively.

The reasons why the said result is obtained are that the surface of ceramic balls is glossy and smooth in case that a certain amount of silver compound is adhered to ceramic balls, and that the surface of ceramic balls is not glossy and smooth in case that silver compound adhered to ceramic balls is less than a certain amount, and thus the amount of the adhered silver compound is small.

On the basis of the said obtained result, an experiment for sterilization activity was commenced ad follows by using ceramic balls having smooth surface manufactured in Example 3.

<Experiment>

160 g of ceramic balls manufactured as above were charged in a vessel, 500 ml of purified water were added thereto, and then sterilized with high pressured vapor at the temperature of 121° C. for 15 minutes. 0.5ml of buoyant (107 CFU/ml) of strain (Legionella Pneumophila: GIFU 9134) incubated at the temperature of 37° C. for 5 days with agar medium flat plate is added to the vessel, and then shaken. The vessel is continuously shaken for 3 minutes after adding the buoyant of strain. The contents in the vessel are stirred at an interval of 20 seconds for 5 minutes, at an interval of 30 seconds for 30 minutes, and at an interval of 30 minutes for 12 hours, respectively.

1 ml of the said reacted liquid was taken as a sample at every interval, and was diluted with the sterilized and purified water. The number of living bacteria (CFU) per 1 ml of the reacted liquid was counted by using an agar medium flat plate.

solution, by coating a compound having a microbicidal activity to ceramic balls, thereby rendering ceramic balls microbicidal.

What is claimed is:

1. A method for manufacturing ceramic balls for water treatment, comprising the steps of:
    (a) thoroughly dissolving borax ($Na_2B_4O_7 \cdot 10H_2O$) and copper sulfate ($CuSO_4 \cdot 5H_2O$) in an equivalent ratio of 1:1 in water, and drying the solution in accordance with a heating process, to prepare a first composition (A);
    (b) mixing nitric acid and particulate silver in an equivalent ratio of 1:1, adding particulate silica to the mixture of nitric acid and particulate silver under a heating condition, to prepare a second mixture, and drying the second mixture in accordance with an evaporation process, to prepare a second composition (B);
    (c) adding 200 parts by weight of distilled water to 100 parts by weight of spherical ceramic bodies, to prepare a third mixture, adding more than 3 parts by weight of the first composition (A) to the third mixture under a heating condition, to prepare a fourth mixture, and heating the fourth mixture until the total weight of the fourth mixture is reduced by half;
    (d) adding more than 8 parts by weight of the second composition (B) to the weight-reduced fourth mixture, to prepare a fifth mixture, and drying the fifth mixture, to obtain ceramic balls coated with the first composition (A) and the second composition (B); and
    (e) sufficiently dehydrating the ceramic balls at a temperature of 400° C. to 500° C.

2. The method according to claim 1, wherein the particulate silica is added at the step (b) in a weight ratio of 2:0.5 to 2:1 (w/w) with respect to the particulate silver.

3. The method according to claim 2, wherein the first composition (A) is added at the step (c) in an amount of 3 to 7 weight percentages based on 100 weight percentages of the ceramic balls.

4. The method according to claim 3, wherein the second composition (B) is added at the step (d) in amount of 8 to 15

TABLE 2

| | Number of Living Bacteria | | | | | | | |
|---|---|---|---|---|---|---|---|---|
| | initial time | 3 min. | 5 min | 30 min. | 1 hr. | 3 hrs. | 6 hrs. | 12 hrs. |
| Exp. | $2.3 \times 10^5$ | $1.2 \times 10^5$ | $2.4 \times 10^4$ | $3.2 \times 10^3$ | $2.8 \times 10^3$ | $2.6 \times 10^3$ | $2.3 \times 10^2$ | 9 |

As is apparent in Table 2, as result of an experiment for sterilization by using ceramic balls manufactured by the present invention, it was confirmed that the bacteria are rapidly reduced with the lapse of time, and that the number of living bacteria is less than 10 after 12 hours.

As described above, the present invention provides a method for manufacturing ceramic balls for water-treatment capable of exerting excellent microbicidal activity in water weight percentages based on 100 weight percentages of the ceramic balls.

5. The method according to claim 1, wherein the first composition (A) is added at the step (c) in an amount of 3 to 7 weight percentages based on 100 weight percentages of the ceramic balls.

* * * * *